United States Patent [19]
van Dam

[11] Patent Number: 4,514,713
[45] Date of Patent: Apr. 30, 1985

[54] INDUCTIVE BALLAST COATED WITH AN INSULATION LAYER AND METHOD OF COATING THE BALLAST

[75] Inventor: Jacobus I. M. van Dam, Oss, Netherlands

[73] Assignee: U.S. Philips Corporation, New York, N.Y.

[21] Appl. No.: 450,313

[22] Filed: Dec. 16, 1982

[30] Foreign Application Priority Data

Dec. 24, 1981 [NL] Netherlands .................... 8105830

[51] Int. Cl.³ ............. H01F 27/02; H01F 27/04; B05D 5/12
[52] U.S. Cl. .................................... 336/96; 336/107; 427/58; 427/116
[58] Field of Search ............ 336/96, 192, 205, 107; 427/58, 116

[56] References Cited

U.S. PATENT DOCUMENTS 3,387,245 6/1968 Czernobil .................. 336/192
3,646,582 2/1972 Van Alphen et al. ......... 336/107 X
3,851,225 11/1974 Luchetta ................... 336/96 X Primary Examiner—Michael R. Lusignan
Attorney, Agent, or Firm—Robert T. Mayer; Bernard Franzblau

[57] ABSTRACT

A method of coating an inductive stabilization ballast for a discharge lamp with an insulating layer and to a stabilization ballast (1) coated by means of this method. The ballast is immersed, together with a synthetic resin cover (10) covering plug-in contact sockets (4 and 5), in a bath (31) of hardenable liquid insulating material. After immersion, a looped suspension member (12)—which was used during the immersion—is broken from the synthetic resin cover so that the electrical plug-in contact sockets become accessible again. This method prevents the plug-in contact sockets from being coated with insulating material.

13 Claims, 6 Drawing Figures

INDUCTIVE BALLAST COATED WITH AN INSULATION LAYER AND METHOD OF COATING THE BALLAST

This invention relates to a method of coating an inductive stabilization ballast, which is provided with an electrical connection member, with an insulating layer, the insulating layer being applied to the stabilization ballast in the liquid state and then being solidified. The invention further relates to an inductive stabilization ballast which is coated with an insulating layer by means of said method.

An inductive stabilization ballast is a unit which serves to stabilize the electric current through a gas and/or vapour discharge lamp.

A known method of the aforesaid kind is described, for example, in U.S. Pat. No. 3,387,245.

A disadvantage of this known method is that if not only a part of the ballast, but practically the whole ballast is coated with an insulating layer, complications occur with respect to the electrical connection members of the ballast. Before giving an explanation of this fact, it should be noted that for considerations of electrical security during operation of the ballast—for stabilizing a discharge lamp—a practically complete coating of an inductive stabilization ballast with an insulating layer is to be preferred to only a partial coating thereof. The complications during—and immediately after—the method are that in this case bare electrical connection members (such as supply conductors) of the ballast are also provided with an insulating layer so that in order to be able to electrically connect the ballast, at least part of the insulation on these connection members has to be removed. In the case of mass production, this is a very great disadvantage.

It should further be noted that the ballast must be freely accessible from all sides if by means of the known method the whole ballast is coated with an insulating layer in one process step. This can be realized, for example, by suspension of the ballast. For this purpose, however, a suspension member for the ballast is required, for example, a mounting part provided with a hole.

An object of the invention is to provide a method of the kind mentioned in the preamble, in which the electrical connection member—of the inductive stabilization ballast—remain free from the insulating layer and in which this stabilization ballast need not be provided with a permanent suspension member.

A method according to the invention of coating an inductive stabilization ballast, which is provided with an electrical connection member, with an insulating layer, the insulating layer being applied to the stabilization ballast in the liquid state and then being solidified, is characterized in that first the electrical connection member is covered by a made of synthetic resin, which at least in part consists of a suspension member for the stabilization ballast, in that then the ballast is suspended by means of this suspension member and in that subsequently the insulating layer is applied, whereafter the suspension member is broken off in such a manner that the electrical connection member becomes accessible again.

The term "breaking off" also includes here tearing off and breaking apart.

An advantage of this method is that electrical connection members of the inductive stabilization ballast remain free from the insulating layer. Such an insulating layer need therefore not be removed. A further advantage is that the stabilization ballast need not be provided with a permanent suspension member.

The invention is based inter alia on the idea to cover the electrical connection member of the stabilization ballast temporarily, i.e. during the time in which the insulating layer is applied to the ballast. The invention is further based on the idea of using the synthetic resin cover at the same time as a suspension member, with the help of which the ballast is supported during the application of the insulating layer. Finally, it is recognized that the suspension member—at least locally—should have such a mechanical strength that on the one hand it is capable of carrying the weight of the ballast, but on the other hand it can be readily removed by breaking off, as a result of which the electrical connection member becomes accessible again.

The application of the insulating layer may be effected, for example, by means of liquid spraying devices arranged around the stabilization ballast.

In a preferred method according to the invention, the insulating layer is applied by immersing the ballast suspended from the suspension member in a bath of insulating material.

An advantage of this preferred method is that in this case practically no insulating material is lost.

In a next preferred method according to the invention, in the beginning of the process of applying the insulating layer, an air space is present between the electrical connection member and the synthetic resin cover, and air is trapped in said space during the further part of the process of applying the layer.

This can be realized by ensuring that the synthetic resin cover is arranged around the electrical connection member with a certain amount of clearance and that then the synthetic resin cover is connected, for example, in an air-tight manner to the remaining part of the ballast. Instead of providing an air-tight connection, however, it is also possible that—during the immersion in the bath of insulating material—the synthetic resin cover prevents the air concerned from escaping due to its special shape. The synthetic resin cover then acts as a kind of diving-bell.

An advantage of the latter preferred method is that the synthetic resin cover lies free from the electrical connection member, as a result of which the risk of damage to the electrical connection member during breaking off of the suspension member—according to the method—is rather small. The air between the electrical connection member and the part of synthetic resin ensures that during the application of the insulating layer the synthetic resin cover is not pressed against the electrical connection member. The synthetic resin cover and the electrical connection member in fact are substantially not deformed, during applications of this insulating layer.

In a further preferred method according to the invention, in which the suspension member is a loop, the suspension of the ballast takes place by means of a hook which is passed through the loop.

An advantage of this method is that the ballast can be suspended and can be disengaged again—after the application of the insulating layer—in a simple manner.

The invention also relates to an inductive stabilization ballast which is coated with an insulating layer by means of a method according to the invention, the whole stabilization ballast being coated with the insulating layer except for the electrical connection member, which is constructed as a plug-in contact socket.

An advantage of this inductive stabilization ballast is that its electrical connection to the discharge lamp concerned and to any further circuit elements is very simple. It should be noted that it would be practically impossible to use plug-in contacts without covering these electrical connection members during the method of applying the insulating layer because these plug-in contact sockets then would be coated with insulating material. This insulating material could then be removed only with great difficulty.

In a preferred embodiment of an inductive stabilization ballast according to the invention, the plug-in contact socket is accessible through an opening—bounded by a surface of fracture—in said synthetic resin cover.

An advantage of this preferred embodiment is that this inductive stabilization ballast can be manufactured in a simple manner. The said surface of fracture is formed during breaking-off of the suspension member during the method according to the invention.

A method—and a product—according to the invention will be described more fully with reference to a drawing.

Figures 1, 2:
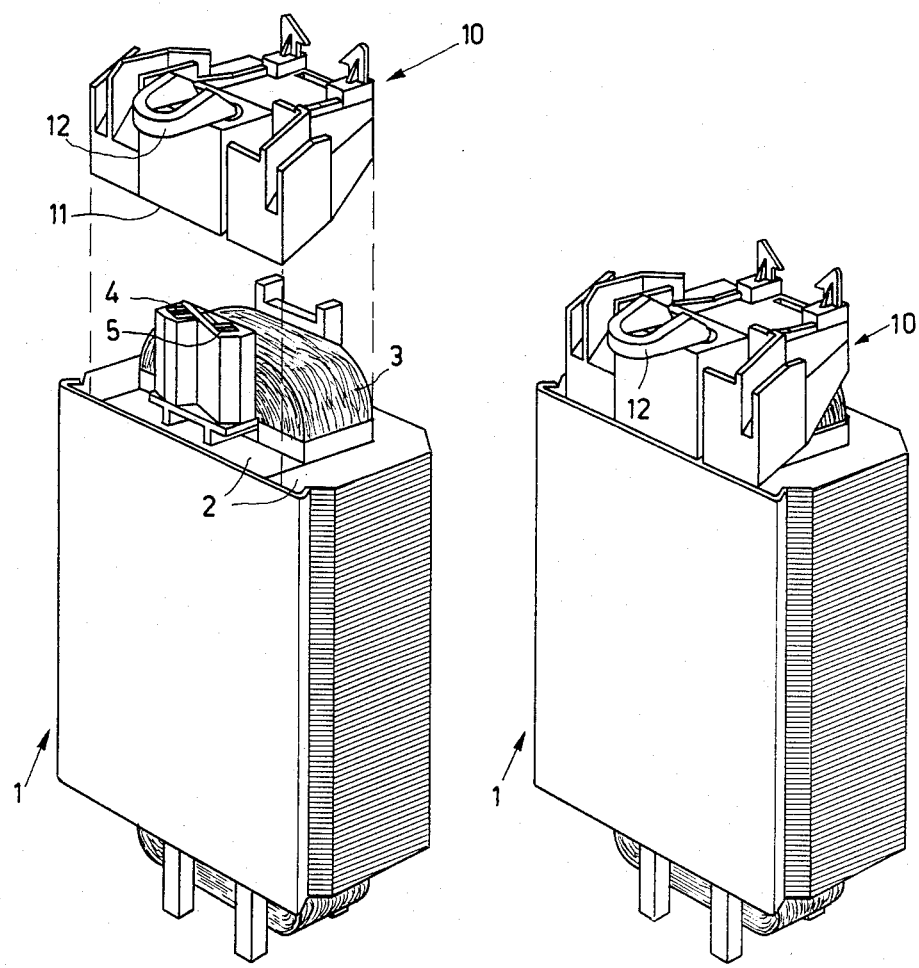
FIG. 1 is a perspective view of an inductive stabilization ballast not yet coated with an insulating layer along with a part made of synthetic resin provided with a suspension member destined to be secured on the stabilization ballast.
FIG. 2 is a perspective view of the assembly of the inductive stabilization ballast of FIG. 1 and the part of synthetic resin of FIG. 1 secured thereon.

In FIG. 1, reference numeral 1 designates an inductive stabilization ballast. This is a ballast for stabilizing the electric current through a low-pressure mercury vapour discharge lamp (not shown) of approximately 15 Watt. The dimensions of this ballast are approximately 7 cm×4 cm×2.5 cm. Such a ballast can be used, for example, in a lamp unit as shown in U.S. Pat. No. 4,383,200.

The stabilization ballast is composed of U and T laminations (2) and comprises an electric winding 3. Two connection members of this winding 3 are constructed as plug-in contact sockets 4 and 5.

FIG. 1 shows a hood-shaped part 10 of synthetic resin. This part comprises a member 11 for securing it to the ballast 1 (of FIG. 1). The part 10 of synthetic resin is further provided with a looped portion 12 which serves as a suspension member, as described below.

FIG. 2 shows the inductive stabilization ballast 1 and the part 10 of synthetic resin secured thereon. A space filled with air is present between the plug-in contact sockets 4 and 5 (FIG. 1) and the part 10 of synthetic resin.

Figure 3:
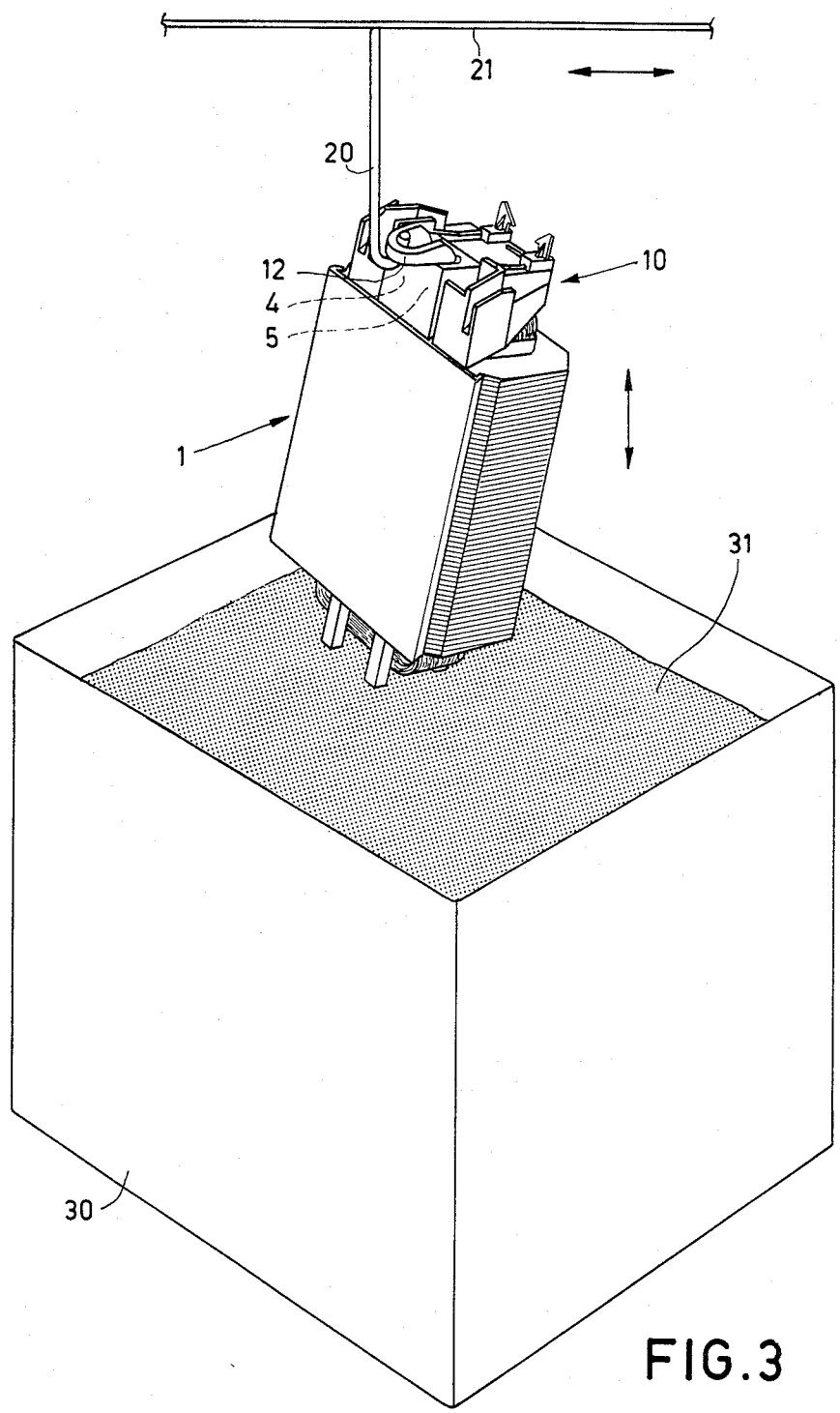
FIG. 3 is a perspective view of the assembly of FIG. 2 suspended from a hook above a trough containing an insulating material in the liquid state.

FIG. 3 shows a stage in the method according to the invention, in which the assembly of the stabilization ballast 1 and the part 10 of synthetic resin is suspended from a hook 20. This hook 20 is passed through the looped portion 12 of the part 10 of synthetic resin. On the other end the hook is secured to a transport cable 21 which inter alia can be moved downwards and upwards again.

Under the ballast 1 is arranged a trough 30 which is filled with a liquid insulating material 31, in this case a polyester immersion lacquer.

In a subsequent stage, the transport cable 21 is moved downwards, by an auxiliary device, not shown, so that the assembly of the ballast 1 and the part 10 of synthetic resin is immersed in the liquid 31. The hood-shaped part 10 of synthetic resin then acts as a diving-bell so that the air between the plug-in contact sockets 4 and 5 and this part of synthetic resin cannot escape.

Subsequently, the transport cable 21 is moved upwards, as a result of which the position of FIG. 3 is reached again. The assembly coated with lacquer (1,10) is then enamelled for approximately half an hour in a furnace (not shown) at a temperature of approximately 180° C. The result is that the whole assembly of the ballast 1 and the part 10 of synthetic resin is coated with a hard insulating—and also corrosion-preventing—lacquer layer 31a, see FIG. 4.

Figures 4, 5:
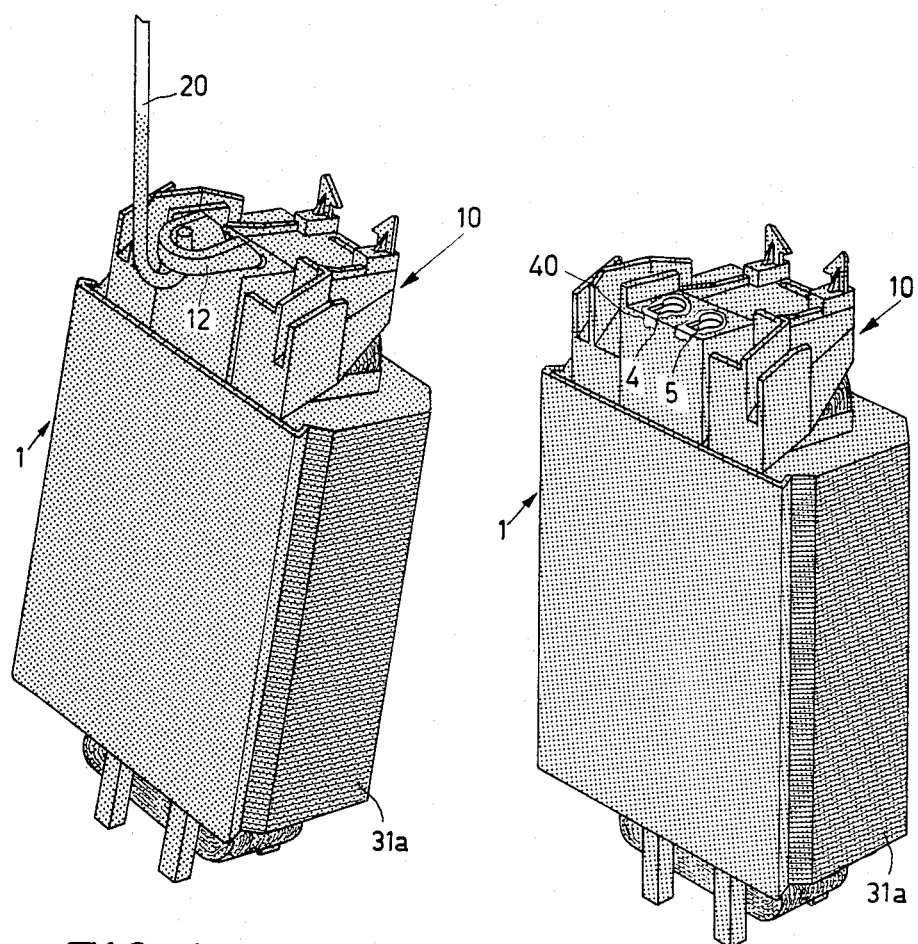
FIG. 4 is a perspective view of the suspended assembly of FIG. 2, after this assembly has been immersed in the liquid insulating material and then has been enamelled.
FIG. 5 shows an inductive stabilization ballast according to the invention. This figure is a perspective view of the assembly of FIG. 4, but after the suspension member has been broken from the part of synthetic resin.
Figure 6:
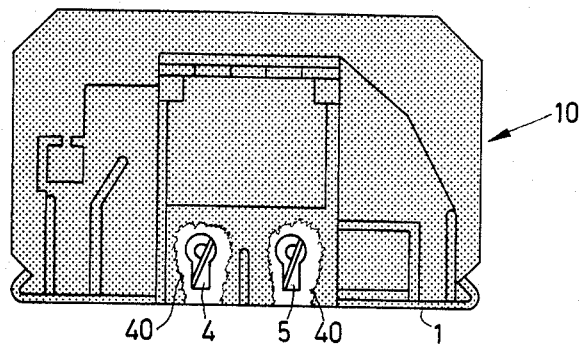
FIG. 6 is a side elevation of a part of the inductive stabilization ballast of FIG. 5 comprising an electrical plug-in contact.

Subsequently the hook 20 is removed and the looped portion 12 is broken off. As a result, the situation shown in FIG. 5 and FIG. 6 is obtained. The plug-in contact sockets 4 and 5 are now accessible again, in this case through an opening—bounded by a surface of fracture 40—in the remaining section of the part 10 of synthetic resin.

The stabilization ballast, which is now finished, is connected in series with the said low-pressure mercury vapour discharge tube. This series-combination is connected to a low-frequency alternating supply voltage. The electrical connection wires used for this purpose are inserted into the contact sockets 4 and 5, spring contacts preventing in known manner those wires from being pulled out again.

The method according to the invention has been schematically described above with reference to one ballast. In the case of mass production, in general not one ballast, but a number of ballasts will be immersed in the same bath at the same time. Each of these ballasts is then suspended, for example, from its own hook. The transport cable 21 may then be replaced by a wide suspension unit.

An advantage of the method described is that the electrical connection members of the stabilization ballast need not be freed from insulating material.

What is claimed is:

1. A method of coating an insulating layer on an inductive stabilization ballast provided with an electrical connection member comprising, first covering the electrical connection member with a cover of synthetic resin which at least in part includes a suspension member for the stabilization ballast, then suspending the ballast by means of said suspension member and applying the insulating layer in a liquid state to the ballast, and breaking off the suspension member after the insulating layer has solidified in a manner such that the electrical connection member becomes accessible again.

2. A method of coating an inductive stabilization ballast with an insulating layer as claimed in claim 1, characterized in that the insulating layer is applied by immersing the ballast suspended from the suspension member in a bath of insulating material.

3. A method as claimed in claim 1, characterized in that at the beginning of the process of applying the insulating layer an air space is provided between the electrical connection member and the synthetic resin cover, and in that the air is trapped in said space during the further part of the process of applying the insulating layer.

4. A method as claimed in claim 3, characterized in that the suspension member is a loop, the ballast being suspended by means of a hook which is passed through the loop.

5. A method as claimed in claim 1 characterized in that at the beginning of the process of applying the insulating layer an air space is present between the electrical connection member and the synthetic resin cover, and in that the air is trapped in said space during the further part of the process of applying the insulating layer.

6. A method as claimed in claim 5 characterized in that the suspension member is a loop, the ballast being suspended by means of a hook which is passed through the loop.

7. A method as claimed in claim 2 characterized in that the suspension member comprises a loop, the ballast being suspended by means of a hook which is passed through the loop.

8. A method as claimed in claim 1 characterized in that the suspension member comprises a loop, the ballast being suspended by means of a hook which is passed through the loop.

9. An inductive stabilization ballast comprising a core member formed of laminated magnetic elements and an electric winding mounted thereon, an electrical connection member comprising electric plug-in contact sockets, a cover made of a synthetic material covering said plug-in contact sockets, and a layer of insulating material coating the whole ballast except for the plug-in contact sockets which are accessible via an opening in the cover of synthetic material, said opening being bounded by a surface of fracture in said cover.

10. A ballast as claimed in claim 9 wherein said insulating layer is coated on the ballast and said opening is formed by breaking off a piece of said cover subsequent to coating the insulating layer on the ballast thereby to provide said opening in the cover bounded by said surface of fracture.

11. An inductive stabilization ballast comprising, a magnetic core member with an electric winding thereon, an electrical connection member comprising electric plug-in contact sockets, a hood made of a synthetic material covering said plug-in contact sockets, a layer of insulating material coating the whole ballast including the hood, said plug-in contact sockets being accessible via openings in the hood of synthetic material, and wherein the magnetic core member comprises a plurality of U-shaped and T-shaped laminations and said openings in the hood are bounded by a surface of fracture therein.

12. An inductive stabilization ballast comprising, a magnetic core member with an electric winding thereon, an electrical connection member comprising electric plug-in contact sockets connected to said winding, a cover made of a synthetic material covering said plug-in contact sockets, and a layer of insulating material coating the whole ballast surface including the cover and formed by immersion of the core member and cover in a bath of liquid insulating material, and wherein a plug-in contact socket is accessible through an opening in the cover of synthetic material bounded by a surface of fracture which is free of said insulating material.

13. A ballast as claimed in claim 12 wherein said opening and said plug-in contact socket are in alignment.

* * * * *

UNITED STATES PATENT AND TRADEMARK OFFICE
CERTIFICATE OF CORRECTION

PATENT NO. : 4,514,713

DATED : April 30, 1985

INVENTOR(S) : JACOBUS I.M. VAN DAM

It is certified that error appears in the above-identified patent and that said Letters Patent is hereby corrected as shown below:

In the Claims:

Claim 3, line 1, change "claim 1" to --claim 2--

Signed and Sealed this

Twenty-fifth Day of March 1986

[SEAL]

Attest:

DONALD J. QUIGG

Attesting Officer

Commissioner of Patents and Trademarks